US008201582B2

(12) United States Patent
Stroganov et al.

(10) Patent No.: US 8,201,582 B2
(45) Date of Patent: Jun. 19, 2012

(54) HYDROPNEUMATIC ACCUMULATOR WITH A COMPRESSIBLE REGENERATOR

(76) Inventors: Alexander A. Stroganov, Saint Petersburg (RU); Leonid O. Sheshin, Saint Petersburg (RU)

( * ) Notice: Subject to any disclaimer, the term of this patent is extended or adjusted under 35 U.S.C. 154(b) by 686 days.

(21) Appl. No.: 12/330,693

(22) Filed: Dec. 9, 2008

(65) Prior Publication Data

US 2010/0090381 A1 Apr. 15, 2010

(30) Foreign Application Priority Data

Oct. 9, 2008 (RU) ................................ 2008141326

(51) Int. Cl.
*F16L 55/04* (2006.01)

(52) U.S. Cl. ............................................ 138/31; 138/30

(58) Field of Classification Search .................... 138/30, 138/31
See application file for complete search history.

(56) References Cited

U.S. PATENT DOCUMENTS 1,809,927 A * 6/1931 Luigi .............................. 138/30
2,460,121 A * 1/1949 Brielmaier ...................... 138/30
2,682,893 A * 7/1954 Ziebold ........................... 138/30
2,904,077 A 9/1959 Trumper
3,038,553 A * 6/1962 Peters ........................... 181/271
3,054,914 A * 9/1962 Hatsopoulos et al. ......... 310/306
3,456,673 A * 7/1969 Legrand ........................ 137/202
4,427,078 A * 1/1984 Wolters et al. ................ 173/126
4,585,913 A * 4/1986 Yorita ........................... 218/135
4,610,369 A * 9/1986 Mercier ......................... 220/721
5,492,311 A * 2/1996 Kurr et al. ................ 267/140.13
5,971,027 A 10/1999 Beachley et al.
6,076,557 A * 6/2000 Carney ............................ 138/30
6,098,663 A * 8/2000 Larsen ............................ 138/30
6,286,552 B1 * 9/2001 Shimbori et al. ............... 138/31
6,405,760 B1 6/2002 Tranter et al.
6,564,830 B1 * 5/2003 Smith ............................. 138/30
7,108,016 B2 9/2006 Moskalik et al.
7,918,246 B2 * 4/2011 Stroganov ....................... 138/30
2005/0194054 A1 9/2005 Moskalik et al.

(Continued)

FOREIGN PATENT DOCUMENTS

EP 0942194 A1 9/1999

(Continued)

OTHER PUBLICATIONS

"Hydro-Pneumatic Accumulators / HydroTrole Ltd." Hydrotrole, Ltd., Dec. 18, 2008. <http://www.hydrotrole.co.uk>.

(Continued)

*Primary Examiner* — James Hook
(74) *Attorney, Agent, or Firm* — Christopher L. Parmelee; Walker & Jocke

(57) ABSTRACT

A hydropneumatic accumulator includes a shell in which gas and fluid ports are connected, respectively, with gas and fluid reservoirs of variable volume separated by a movable separator. The gas reservoir contains a compressible regenerator that fills the gas reservoir so that the separator movement reducing the gas reservoir volume compresses the regenerator. The regenerator is made from leaf elements located transversally to the separator motion direction and dividing the gas reservoir into intercommunicating gas layers of variable depths. The regenerator is preferably made from interconnected elastic metal leaf elements to allow variation of the bending strain degree so that the local bending strains of the leaf elements should not exceed the elastic limits at any position of the separator. The efficiency of fluid power recuperation and durability of the regenerator are increased.

17 Claims, 5 Drawing Sheets

U.S. PATENT DOCUMENTS

Figure 1:
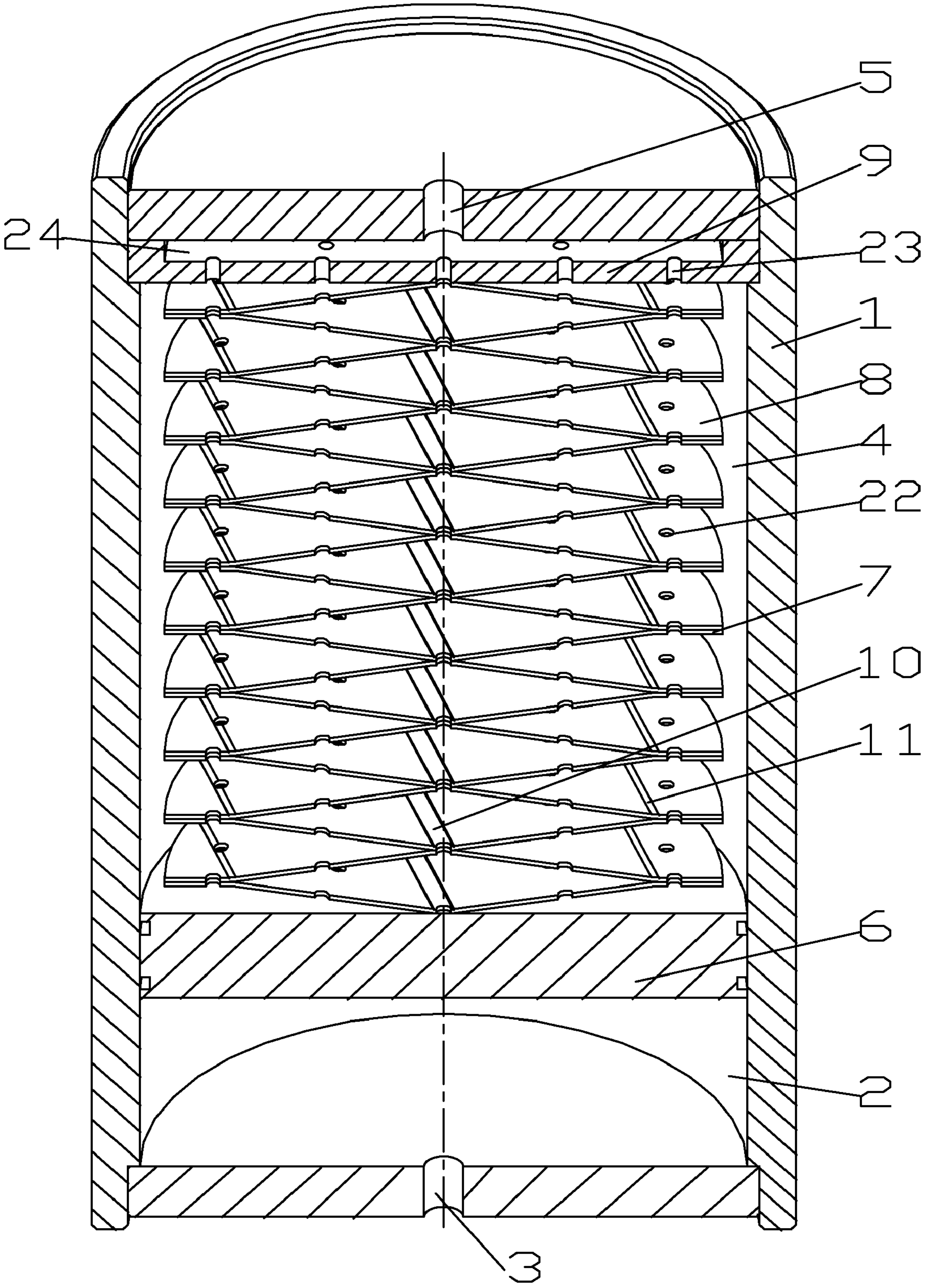

| | | | | |
|---|---|---|---|---|
| 2010/0206389 | A1* | 8/2010 | Kennedy et al. ................ | 137/14 |
| 2011/0220419 | A1* | 9/2011 | Sjodin et al. .................... | 175/99 |

FOREIGN PATENT DOCUMENTS

| | | | |
|---|---|---|---|
| FR | 1094549 | A | 5/1955 |
| GB | 1245717 | A | 9/1971 |
| GB | 1358088 | A | 6/1974 |
| GB | 2019939 | A | 11/1979 |

OTHER PUBLICATIONS

Otis, D.R., "Thermal Losses in Gas-Charged Hydraulic Accumulators." Proceedings of the Eighth Intersociety Energy Conversion Engineering Conference, Aug. 1973, pp. 198-201.

Pourmovahed, A., Baum, S.A., Fronczak, F.J., and Beachley, N.H. "Experimental Evaluation of Hydraulic Accumulator Efficiency with and without Elastomeric Foam." Proceedings of the Twenty-second Intersociety Energy Conversion Engineering Conference, Aug. 10-14, 1987, paper 87-9090, Philadelphia, PA.

Pourmovahed, A. "Durability Testing of an Elastomeric Foam for Use in Hydraulic Accumulators." Proceedings of the Twenty-third Intersociety Energy Conversion Engineering Conference, Jul. 31-Aug. 5, 1988, vol. 2 (A89-15176 04-44), Denver, CO.

Achten, Peter A.J. "Changing the Paradigm." Proceedings of the Tenth Scandanavian International Conference on Fluid Power, May 21-23, 2007, pp. 233-248, vol. 3, Tampere, Finland.

Achten, Peter A.J., Somhorst, Joop H.E., Van Kuilenburg, Robert F., Van Den Oever, Johan P.J., Potma, Jeroen. "CPR for the Hydraulic Industry: The New Design of the Innas Free Piston Engine." Hydraulikdagarna '99, May 18-19, Linkoping University, Sweden.

Stolbov, L.S., Petrova, A.D., and Lozhkin, O.V. "Fundamentals of Hydraulics and Hydraulic Drive of Machines." "Mashinostroenie", 1988, pp. 170-177, Moscow, Russia.

Achten, Peter A.J. "Dedicated Design of the Hydraulic Transformer." Proceedings of the IFK 3, 2002, pp. 1-16, vol. 2, IFAS Aachen.

* cited by examiner

HYDROPNEUMATIC ACCUMULATOR WITH A COMPRESSIBLE REGENERATOR

The invention refers to mechanical engineering and can be used for fluid power recuperation in hydraulic systems with high level of fluid flow and pressure pulsations, including systems with a common pressure rail, in hydraulic hybrid cars, in particular those using free-piston engines, as well as in systems with a high flow rise rate and hydraulic shocks, for example, in molding and press-forging equipment.

STATE OF THE ART

A hydropneumatic accumulator (hereinafter—the accumulator) includes a shell containing a gas reservoir of variable volume filled with pressurized gas through a gas port as well as a fluid reservoir of variable volume filled with fluid through a fluid port. These gas and fluid reservoirs are separated by a separator which is movable relative to the shell. The accumulator is generally charged with nitrogen up to the initial pressure of several to dozens MPa.

For fluid power recuperation accumulators are used both with a solid separator in the form of a piston and with elastic separators, for example, in the form of elastic polymeric membranes or bladders [1] as well as in the form of metal bellows [2]. Accumulators with light polymeric separators smooth pulsations well in the hydraulic system. However, they require more frequent recharge with gas due to the permeability of polymeric separators. A strong jerk of the separator at a high rate of the rising fluid flow from the accumulator (in case of a sharp pressure drop in the hydraulic system, for example) may result in destruction of the polymeric separator. Piston accumulators keep gas better and resist high flow rise rates. However, in the case of intensive pulsations in hydraulic system the vibrating pattern of the piston movement accelerates piston seal wear. In PISTOFRAM accumulators of HYDROTROLE Company [3] the piston contains a chamber divided by the elastic membrane into the gas and fluid parts, respectively connected with the gas and fluid reservoirs of the accumulator. At high-frequency pulsations it is not the piston but the light membrane that vibrates preserving the piston seals.

An accumulator generally contains one gas reservoir and one fluid reservoir of variable pressure, with equal gas and fluid pressure in them. The accumulator [4] contains one gas reservoir and several fluid reservoirs of variable volume. Their commutation changes the ratio between the gas pressure in the gas reservoir and the fluid pressure in the hydraulic system.

For fluid power recuperation the accumulator is preliminarily filled with the working gas through the gas port and is connected through the fluid port to the hydraulic system. When power is transferred from the hydraulic system to the accumulator, the fluid is pumped from the hydraulic system to the accumulator displacing the separator and compressing the working gas in the gas reservoir, while the pressure and temperature of the working gas increase. When the power returns to the hydraulic system from the accumulator, the compressed gas expands displacing the separator with decreased volume of the fluid reservoir and forcing fluid out of it into the hydraulic system. The gas pressure and temperature decrease.

Since the distance between the gas reservoir walls is quite big (dozens and hundreds millimeters) the heat exchange between the gas and the walls due to the gas heat conductivity is insignificant. Therefore the processes of gas compression and expansion are essentially non-isothermal with large temperature gradients in the gas reservoir. When the gas pressure rises 2-4 times, the gas temperature rises by dozens and hundreds degrees and convective flows arise in the gas reservoir. This increases heat transfer to the gas reservoir walls dozens and hundreds times. The gas heated during the compression cools down. This results in gas pressure decrease and losses of the stored power that are especially considerable when the stored power is kept in the accumulator. With large temperature differences the heat transfer is irreversible, i.e. the greater part of the heat given up to the walls of the accumulator from the compressed gas cannot be returned to the gas during the expansion. Therefore, the hydraulic system receives back much less hydraulic power during the gas expansion than it was received during the gas compression.

To reduce heat losses in [4], [5], [6], [7] it is suggested to place a compressible regenerator (foamed elastomer) which performs the function of a heat regenerator and insulator into the gas reservoir. In the accumulator according to [7] taken by us as the prototype the accumulator includes a shell in which fluid and gas ports are respectively connected with fluid and gas reservoirs of variable volume separated by a separator movable relative to the shell. The gas reservoir of variable volume contains a compressible regenerator in the form of open-cell elastomer foam filling the gas reservoir so that when fluid is pumped into the accumulator the separator movement reducing the gas reservoir volume compresses the regenerator. When the fluid is displaced out of the accumulator, the regenerator expands due to its intrinsic elasticity. When compressed, the regenerator takes away some heat from the gas and reduces its heating, and, when expanded, it returns the heat to the gas and reduces its cooling. The small (about 1 mm) size of the regenerator cells decreases the temperature gradients during the heat exchange between the gas and regenerator hundreds of times and increases the heat exchange reversibility during gas compression and expansion considerably. The porous structure of the regenerator prevents convective heat exchange of the gas with the gas reservoir walls, thus decreasing the heat transfer to the gas reservoir walls and the respective power losses many times. Therefore, practically all the heat given by the gas to the regenerator during the compression is returned to the gas during the expansion while the recuperation efficiency increases considerably [5], [6].

A disadvantage of the described solution is the fact that the amplitudes of the cell depth variation are commensurable with the size of the webs between the cells. The relative deformations of the webs are big (dozens percent), which is aggravated by the specific features of the polymer material of the webs characterized by plasticity even in case of relatively small deformations. Thus, in case of continuous service there occurs fatigue degradation of the regenerator resulting in deterioration of its elastic properties and development of residual deformation of the elastomer foam. As a result, the regenerator loses its ability to reshape and to fill the entire volume of the gas reservoir while the recuperation efficiency decreases. In the experiments [8] the accumulated residual deformation reaches one quarter of the initial volume of the regenerator and growing losses of the fluid power in the piston accumulator already within 36000 cycles (400 hours) of slow (0.025 Hz) compression and expansion can be observed. Foam degradation strengthens considerably in real hydraulic systems where due to the high-frequency pulsations the separator moves non-uniformly, with frequent jerks especially strong in hydraulic hybrid cars [9] using strongly intermittent free-piston engines [10] and phase-controlled hydraulic transformers [11] as well as in hydraulic systems with a common pressure rail. With such a vibrating impact of the jerking separator the boundary layer of the regenerator adjacent to the separator is exposed to the highest load and destruction. Its springiness is not sufficient to transmit acceleration from the separator to the entire mass of the regenerator. If the amplitude of the separator vibration is commensurable with the cell size, the boundary layer is crushed and destroyed, which is followed by destruction of the next layer. Hydraulic shocks have similar destructive effect on boundary layers of the foam. Exploitation at increased temperatures typical for mobile applications also accelerates the processes of foam degradation. It should be also considered that the elastic properties of foamed elastomers deteriorate at low temperatures.

Besides, no reliability is ensured in the above-described accumulator during working gas charging and discharging. The cleavage stress of the existing foams is low, about 0.1-1 MPa. During the fast processes of gas charging and discharging considerably larger local pressure drops in the foam may arise, especially near the gas port where the gas flow density is the highest. This will cause foam destruction. During gas charging the foam can be damaged and cavities can form near the gas port. During gas discharging the foam can be entrained by the gas flow into the gas port, which results both in foam losses and formation of cavities and in failure of check and pressure-relief valves of the gas port. The danger of the foam being entrained into the gas port during fast gas exchange processes also restricts application of gas receivers together with the above-described accumulator.

ESSENCE OF THE INVENTION

The object of the present invention is the creation of a robust and reliable hydropheumatic accumulator for highly efficient fluid power recuperation suitable for use in fluid power systems with considerable high frequency pulsations, hydraulic shocks or high flow rise rates as well as suitable for use together with gas receivers and suitable for use at increased and reduced ambient temperatures.

To solve the task a hydropneumatic accumulator (hereinafter—the accumulator) is proposed that includes a shell containing a fluid reservoir of variable volume connected with a fluid port and a gas reservoir of variable volume connected with a gas port. These gas and fluid reservoirs are separated by a separator movable relative to the shell. The gas reservoir contains a compressible regenerator (hereinafter—the regenerator) that fills the gas reservoir so that the separator movement reducing the gas reservoir volume compresses the regenerator.

The task is solved by the following:

the regenerator is made of leaf elements located transversally to the separator motion direction and dividing the gas reservoir into intercommunicating gas layers of variable depth, wherein the leaf elements of the regenerator are kinematically connected with the separator allowing for increase of the depth of the gas layers separated by them at the gas reservoir volume increase and for decrease of said gas layers depth at the gas reservoir volume decrease.

Division of the gas reservoir volume into thin layers and, thus, reduction of the average distances to the heat-exchange surfaces improves the heat transfer conditions and reduces the temperature differences increasing the reversibility of the gas compression and expansion processes in the gas reservoir and, hence, the recuperation efficiency. The higher the initial gas pressure and the rate of change of the gas reservoir volume during fluid pumping or displacement and the less the required temperature difference, the less should be the chosen average depth of the gas layers at the maximum volume of the gas reservoir, i.e. the more leaf elements should the regenerator have.

For accumulators of wide application intended for use with the initial gas pressures of about 10 MPa and the pumping and displacement periods from seconds to dozens of seconds it is preferable to choose the number, shape and arrangement of the leaf elements so that with the maximum gas reservoir volume the average depth of the gas layers should not exceed 10 mm. In this case the specific, i.e. relative to the maximum gas reservoir volume, heat capacity of the regenerator exceeds the gas heat capacity at the maximum initial pressure, preferably exceeding 100 KJ/K/m3.

The embodiment of the regenerator in the form of a layered structure with leaf elements which sizes (tens and hundreds mm) exceeding considerably the amplitude of the depth variation (not more than units mm) of the layers separated by them allows to do with small relative deformations of the regenerator elements throughout the range of the separator motion using materials with good elastic properties in a wide temperature range, for example, metals or their alloys.

The kinematic connection of the leaf elements with the separator can be provided by various means, for example, by using separate springs connected with the separator and the shell, with the leaf elements fixed on the springs at a prespecified spacing.

In bellows accumulators the leaf elements can be attached directly to the bellows at a prespecified spacing.

For piston accumulators it is preferable to use the elastic properties of the leaf elements themselves and to make the regenerator in the form of a multilayer spring consisting of joined to each other elastic metal leaf elements working as leaf or convex spring.

In the embodiment preferred in terms of cost efficiency the regenerator is made of interconnected elastic leaf elements providing the possibility of variation of the bending strain degree at the separator motion. To increase durability the number of the leaf elements as well as the number, location and shape of the seams of the neighboring leaf elements are chosen so that the local bending strains of the leaf elements do not exceed the elastic strain limits at any position of the separator.

The leaf elements can be attached by gluing, welding or using other types of binding. The leaf elements can also be just put together, thrusting against one another, to form a multilayer leaf spring working in compression if they were preliminary molded so that the stressless state corresponds to the layer depth greater than in case of the maximum gas reservoir volume.

For further reduction of the deformation amplitude it is proposed to make the regenerator so that the stressless state of the leaf element corresponds to the intermediate position of the separator when the gas reservoir volume is equal to the intermediate value between the maximum and minimum values. For that purpose it is proposed to use initially flat leaf elements interconnected by spacers of the chosen thickness preferably not less than 0.3 of the average depth of the gas layer at the maximum gas reservoir volume or to use leaf elements molded (by stamping or flexible molding) so that their stressless state corresponds to said intermediate position of the separator.

In the embodiment of the accumulator preferred in terms of the storage time of the stored fluid power the regenerator includes a flexible porous thermal insulator reducing the heat transfer from the leaf elements to the shell of the accumulator.

The invention provides for embodiments preferred for application in fluid power systems with considerable high frequency pulsations, hydraulic shocks and high flow rise rates wherein the regenerator is made with higher springiness or reduced gas permeability near the separator. The lower its gas permeability and the greater the difference between the rates of expansion or compression of the gas layers between the regenerator elements, the more the reduced gas permeability prevents balancing of the pressures between the separated gas layers. As the separator jerks become stronger, the growing pressure drop between these layers accelerates the regenerator elements, thus reducing the load on the boundary elements of the regenerator adjacent to the separator and reducing their local deformations. Higher springiness can be achieved by increasing the thickness of the leaf elements, changing the configuration of their interconnections or introducing additional elastic connecting elements. The gas permeability can be lowered by reducing the number or size of the holes in the leaf elements and by reducing the gaps between the edges of the leaf elements and the gas reservoir walls.

For application in fluid power systems with considerable high frequency pulsations the accumulator embodiment is proposed. The separator is made in the form of a piston with a chamber and bellows in it separating the chamber into a fluid part and a gas part communicating with the fluid and gas reservoirs, respectively, through the windows in the piston. The bellows are made of leaf elements located transversally to the direction of the piston motion, dividing the gas part of the chamber in the piston into communicating gas layers of variable depth and allowing for increase of the depth of the gas layers separated by said leaf elements at the volume of the gas part of said chamber increase and decrease of said gas layers depth at said gas part volume decrease. The light bellows receive the high frequency component of the fluid flow pulsations preventing the piston from vibrations and reducing the wear of its seal. The embodiment of the bellows with the average depth of the gas layers between the leaf elements of the bellows at the maximum volume of the gas part of the chamber in the piston not exceeding 10 mm ensures good heat exchange between the gas and the leaf elements of the bellows that supplement the leaf elements of the main regenerator in the gas reservoir of the accumulator in such an embodiment.

For embodiments of the accumulator intended for wide application it is preferable to choose the gas permeability and springiness of the regenerator near the separator so that the local deformations of the leaf elements do not exceed the elastic strain limits at the strongest jerks of the separator corresponding to the maximum possible rate of rise of the fluid flow from the accumulator that may arise at instantaneous pressure drop in the hydraulic system connected to the accumulator from the maximum to the atmospheric pressure.

The task of preventing the regenerator damage during gas charging and recharging is achieved by that the gas port contains a flow restrictor made with the possibility of restricting the gas flow through the gas port so that the pressure drop on said restrictor in case of an open gas port exceeds, preferably 10 and more times, the maximum pressure difference between different spaces of the regenerator.

In the accumulator embodiments preferred in terms of accelerated gas charging and discharging and for application together with receivers the regenerator is made with increased gas permeability near the gas port, which compensates for the increased density of the gas flow near the gas port during gas charging and discharging and decreases the pressure drops in the regenerator.

The details of the preferred embodiments of the invention are shown in the examples given below illustrated by the drawings presenting:

FIG. 1—An accumulator with a separator in the form of a piston and a regenerator in the form of a multilayer leaf spring, axial section.

Figure 2:
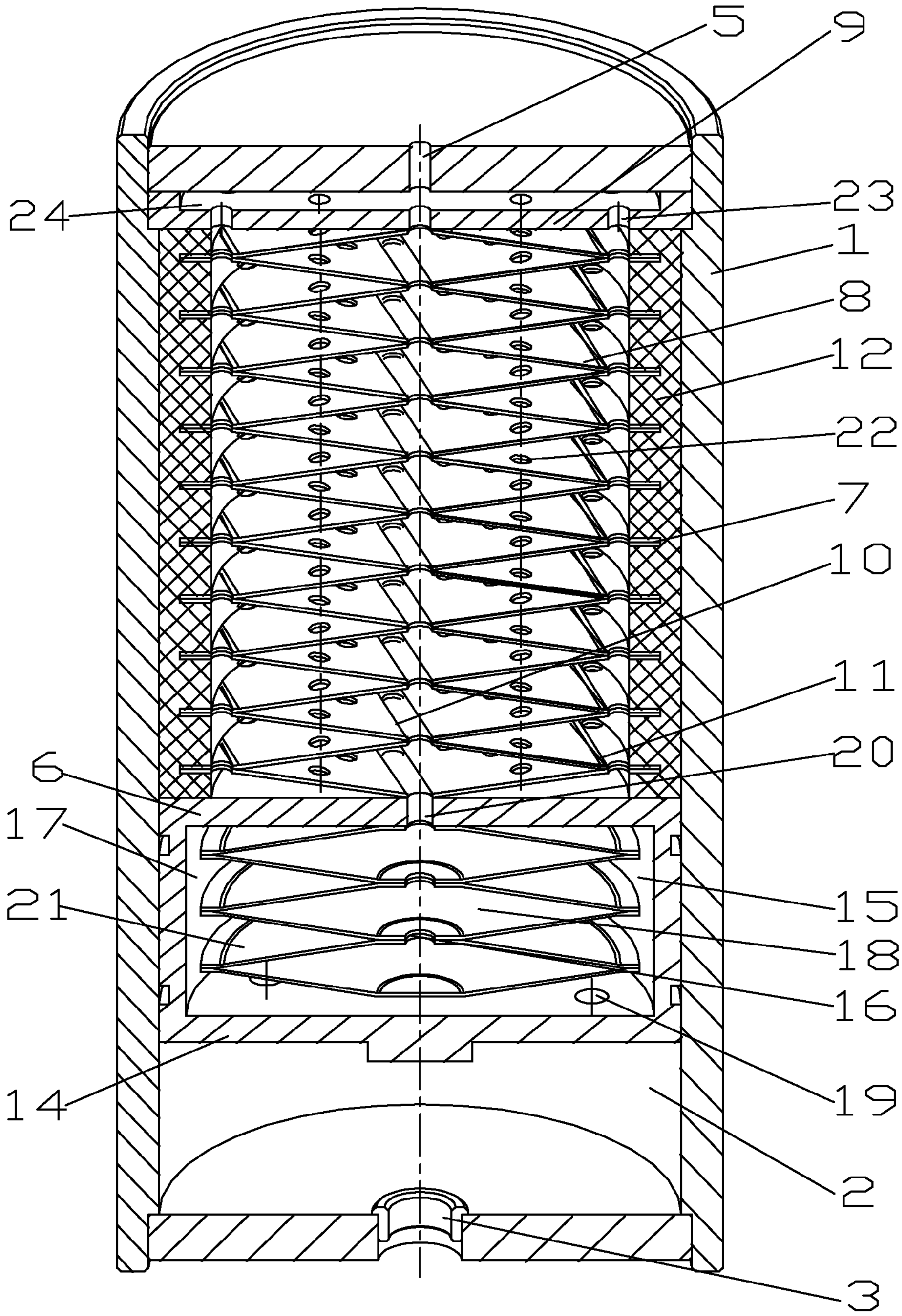

FIG. 2—An accumulator with a composite separator in the form of a hollow piston with bellows and a regenerator in the form of a multilayer leaf spring, axial section.

Figure 3:
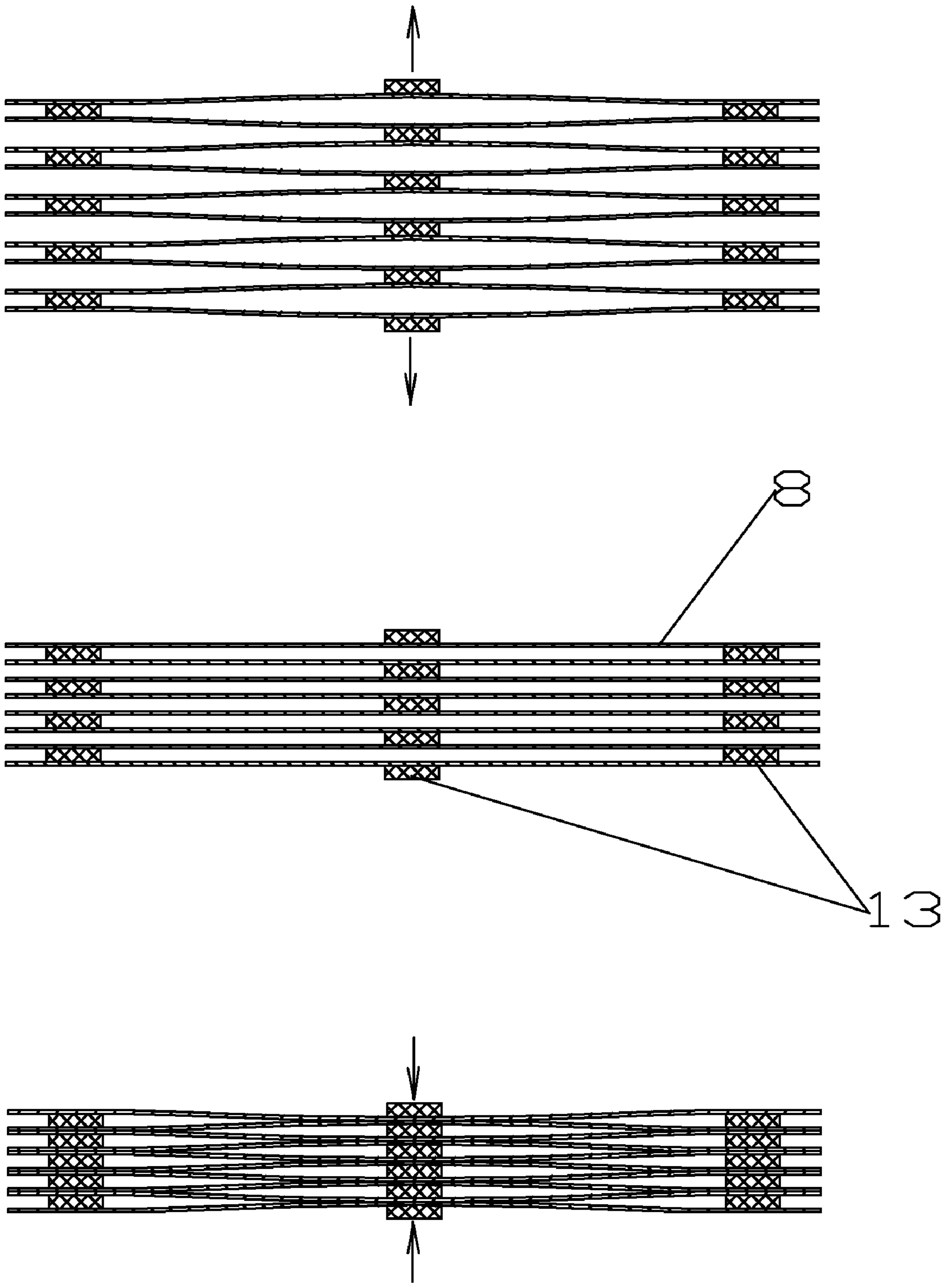

FIG. 3—A fragment of the accumulator in the form of a multilayer leaf spring made of flat leaf elements with strip spacers between them, undeformed and deformed state, axial section.

Figure 4:
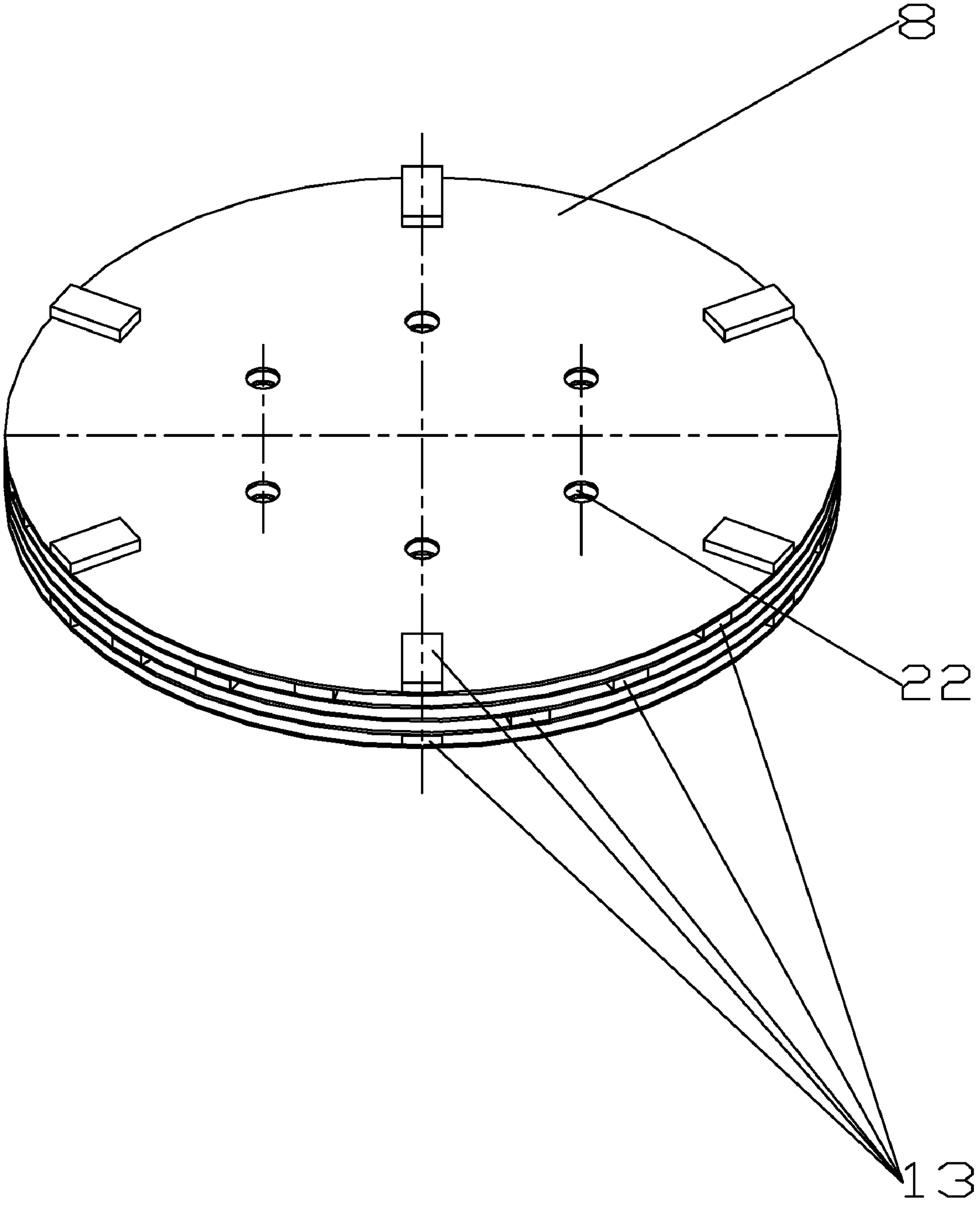

FIG. 4—A fragment of the accumulator in the form of a multilayer leaf spring made of flat leaf elements with sector spacers between them, perspective view.

Figure 5:
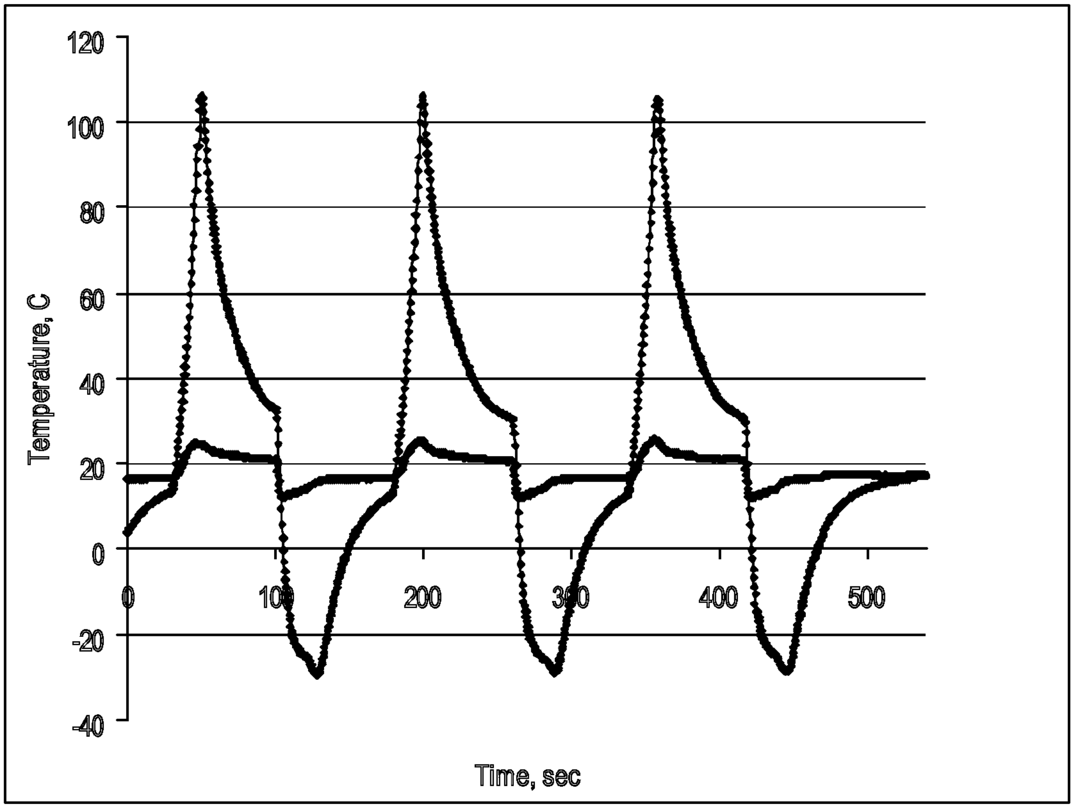

FIG. 5—Experimental curves of variation of the gas temperature in the gas reservoir at recuperation of power for two accumulators: reference one (without a regenerator) (curve 1) and one with a regenerator (curve 2).

The accumulators of FIG. 1 and FIG. 2 comprise the shell 1 with the fluid reservoir 2 of variable volume connected with the fluid port 3 and the gas reservoir 4 of variable volume connected with the gas port 5. Said gas and fluid reservoirs of variable volume are separated by the separator 6 in the form of a piston. The gas reservoir 4 contains the regenerator 7 that fills the gas reservoir 4 so that movement of the separator 6 reducing the volume of the gas reservoir 4 compresses the regenerator 7. The regenerator consists of the leaf elements 8 located transversally to the direction of motion of the separator 6 and dividing the gas reservoir 4 into the intercommunicating gas layers of variable depth. The leaf elements 8 are assembled into regenerator 7 in the form of a multilayer leaf spring attached at one side to the separator 6 and at the other side—to the shell insert 9 installed on the shell 1. Thus, the leaf elements 8 are kinematically connected to one another and to the separator 6 allowing increase of the depth of the gas layers separated by them at the gas reservoir 4 volume increase and decrease of the depth at the volume decrease.

The metal leaf elements 8 are joined together by parallel glue or weld joints, with diametrical 10 and chord 11 joints alternating. The outermost leaf elements are attached to the separator 6 and to the shell insert 9 by diametrical joints (weld or glue). The distance between the diametrical 10 and chord 11 joints determines stiffness of the multilayer leaf spring. In the embodiments of FIG. 1 and FIG. 2 this distance is chosen in the range of 20-50 mm while the maximum depth of the gas layers between the leaf elements is about 0.1 of said distance or less, which ensures small relative bending strains of the leaf elements (for a better illustration the relative deformations of the leaf elements 8 and the distance between them have been enlarged in the figures and their number has been decreased, accordingly). The thickness of one leaf element 8 has been chosen in the range of 0.1-0.2 of the average depth of the gas layer separated by them at the maximum volume of the gas reservoir 4. In this case the specific, i.e. relative to the maximum volume of the gas reservoir 4, heat capacity of the regenerator is 400-800 KJ/K/m3, which exceeds 4-8 times the heat capacity of the gas (nitrogen) at the initial pressure of 10 MPa.

For fluid power recuperation the accumulator (FIGS. 1, 2) prefilled with gas through the gas port 5 is connected with the hydraulic system via the fluid port 3.

During transfer of the power from the hydraulic system to the accumulator the fluid from the hydraulic system is pumped through the fluid port 3 of the accumulator into its fluid reservoir 2, the separator 6 is displaced reducing the volume of the gas reservoir 4 and increasing its gas pressure and temperature. At that the regenerator 7 compresses and the depth of the gas layers between the leaf elements 8 reduces.

Due to the small distances between the leaf elements 8 of the regenerator 7 and its high specific heat capacity the gas effectively gives away part of the heat to the regenerator, which reduces the gas heating at compression; the gas thermal exchange with the leaf elements is reversible, at small temperature differences between the leaf elements and the gas between them. During storage of the fluid power stored in the accumulator the heat losses are small as the reduced gas heating reduces the heat transfer to the walls of the shell due to the heat conductivity of the gas, the heat transfer to the walls of the shell along the leaf elements is also small due to their small thickness and due to the lamellar structure of the regenerator the convective heat transfer to the walls of the shell in the thin gas layers is considerably reduced. To extend the storage period of the stored fluid power the regenerator includes a flexible porous thermal insulator 12 (FIG. 2) made, for example, from foamed elastomer that allows further decrease of the heat transfer between the leaf elements and the walls of the shell.

When power returns from the accumulator to the hydraulic system, the compressed gas expands and the separator 6 is displaced reducing the volume of the fluid reservoir 2 and displacing fluid out of it through the fluid port 3 into the hydraulic system. At that the leaf elements 8 kinematically connected with the separator 6 are moved and the depth of the gas layers separated by them increases ensuring uniform filling of the expanding gas reservoir 4 with the leaf elements. Due to small distances kept between the gas and the leaf elements the regenerator effectively returns the received part of the heat to the gas. Thus, the accumulator returns the fluid power received from the hydraulic system back to it practically without any losses. The small relative deformations of the leaf elements within the elasticity limits throughout the range of movements of the separator prevent development of residual deformations and destruction of the regenerator and ensures reliability and long service life of the accumulator.

For further reduction of the amplitude of deformations of the leaf elements the regenerator is made so that the stressless state of the leaf elements corresponds to the separator position when the gas reservoir volume is equal to chosen intermediate value between the maximum and minimum values. In accumulators intended for operation in hydraulic systems with long shutoff intervals (for example, in industrial systems with night shutoffs) it is preferable to choose said intermediate value close to the maximum one. In accumulators intended for operation in hydraulic systems with a long storage period of the stored fluid power it is preferable to choose said intermediate value close to the minimum one.

This method of joining leaf elements into a multilayer leaf spring allows to obtain the least deformations of the leaf elements during spring stretching, which ensures reliability of the leaf elements joints and, hence, a long service life of the regenerator.

The longest service life is achieved when the leaf elements of the spring pass through their stressless state when the gas reservoir volume changes from the maximum operating volume to the minimum operating one, which ensures their alternating strain and prevents development of residual deformations in them.

In accumulators intended for operation with receivers where it is preferable to ensure the minimum residual gas volume in the gas reservoir 4 the leaf elements 8 can be molded in the form of plates or wave-like sheets and connected by weld or glue joints of minimum possible thickness.

In the regenerators of the accumulators intended for operation without a receiver given in FIG. 3 and FIG. 4 flat leaf elements 8 with alternating configurations of the spacers 13 between them are used.

In the embodiment of FIG. 3 the flat round leaf elements 8 are fastened together to form a multilayer leaf spring by means of the spacers 13 in the form of strips glued to the leaf elements 8 parallel to one another. One spacer 13 is glued to one side of every leaf element 8 along the diameter of the leaf element while two spacers 13 are glued to the other side of the same leaf element along two chords symmetrical relative to the diametric spacer. The initial gas pressure at charging of the accumulator does not generally exceed 0.9 of the minimum working pressure in the hydraulic system. The degree of the gas volume compression typical for power recuperation and corresponding to the maximum stored power is about 2-3. Therefore, the preferred minimum possible volume of the gas reservoir determined by the thickness of the spacers 13 should be not more than 0.3 of the maximum one. The spacers 13 enable the leaf elements 8 to deform in both directions from their stressless state, which enables the multilayer leaf spring both to expand and to compress. In FIG. 3 the period of repeated configurations of the spacers 13 is 2, the closest diametric (or, respectively, chord) spacers in the axial direction are separated by single gaps between the leaf elements 8 while the average depth of the gas layer in case of full compression corresponds to the half thickness of the spacer 13. Thus, to provide the volume compression rate of the gas in the accumulator of no less than 3 the preferred embodiment should have the thickness of the spacers 13 not exceeding 0.6 of the average depth of the gas layer at the maximum volume of the gas reservoir.

In the embodiments of FIG. 4 the flat round leaf elements 8 are fastened together to form a multilayer leaf spring by means of the spacers 13 glued to the leaf elements 8 with the prespecified angular offset. 6 (N in the general case) spacers 13 shifted relative one another by 360/6 (360/N in the general case) degrees are glued to one side of every leaf element 8. On the other side of the same leaf element there are also 6 (N in the general case) spacers 13 with the same offset relative one another. In this case the whole configuration of the spacers 13 on one side is shifted relative to the configuration of the spacers 13 on the other side by 360/24 (360/(N*M) in the general case) degrees. Thus, the configuration of the spacers 13 in every successive layer between the leaf elements 8 is turned by 360/24 degrees relative to the previous one while the configurations with the similar angular position repeat in every fourth layer (with the period M in the general case) and are separated by triple gaps (M−1 in the general case) between the leaf elements 8. The angular size of the spacers 13 is considerably less than 360/24 degrees, which allows compression of the regenerator with relatively small bending strains of the leaf elements. The greater the number of the spacers 13 in one layer N and the less the angular distances between the edges of the spacers of the neighboring layers (decreasing as N, M and angular sizes of the spacers 13 increase), the higher the springiness of the regenerator. The greater the period of repeated configurations M, the higher the maximum degree of compression of the regenerator relative to the position corresponding to the stressless state of the flat leaf elements 8. At full compression the average depth of the layer corresponds to one-fourth (1/M in the general case) of the thickness of the spacers 13, which in case of the required triple degree of volume compression allows to choose the thickness of the spacers 13 equal to or even exceeding the average depth of the gas layer at the maximum gas reservoir volume reducing the load on the glue interfaces.

With stressless state of the flat leaf elements 8 the depth of the gas layers equals the thickness of the spacers 13. Reasoning from the above evaluations of the working range for recuperation of the fluid power it is preferable to choose the maximum degree of volume compression that does not exceed 3 while the minimum thickness of the spacers should be, accordingly, not less than 0.3 of the average depth of the gas layer at the maximum gas reservoir volume. To provide stressless state of the flat leaf elements 8 at zero pressure in the hydraulic system implemented are the spacers 13 with the thickness close to the average depth of the gas layer at the maximum gas reservoir volume with the period of repeated configuration M not less than the required volume compression degree in the accumulator.

To illustrate implementation of the invention FIG. 5 gives the experimental curves of the gas temperature variation in the gas reservoir at recuperation of power for two Hydac accumulators of the SK350-2/2212A6 type with the volume of 2 liters, one of them without a regenerator (curve 1) and the second (curve 2) with a regenerator in the form of a multilayer leaf spring made of 120 flat leaf elements 0.4 mm thick with sector spacers 1 mm thick between them as shown in FIG. 4. In this case the stressless state of the flat leaf elements corresponds to the maximum gas reservoir volume. The ambient temperature is 18° C. The initial gas pressure in both accumulators is 7 MPa. Every cycle consists of 4 steps: fluid pumping into the accumulator up to the pressure of 21 MPa during 20 seconds, storage of the stored power during 50-60 seconds, discharge of the fluid from the accumulator down to the initial pressure of 7 MPa during 30 seconds and a 50-second pause. In the accumulator without regenerator the gas is heated at compression up to 106° C., cools during the storage time down to 30-32° C., cools at expansion down to −30° C. and is heated during the pause up to 10-12° C. At the same time in the accumulator with regenerator the gas is heated at compression up to not more than 25° C. and during expansion it cools down to not more than 12° C. Thus, the regenerator reduces gas heating at compression and gas cooling at expansion dozens of times, thus reducing the losses of the stored power during storage. At any degree of gas compression in this range of pressure variation the relative deformation of the leaf elements (bending less than 1 mm with the bent sections of about 12 mm long) is much less than the elasticity limit.

When the accumulator operates as a part of hydraulic system with high frequency ripple or high flow rise rates and hydraulic impacts the separator 6 moves non-uniformly, with strong jerks that increases the load on the leaf elements 8 adjacent to the separator 6 through which the entire regenerator 7 is involved into accelerated movement.

To prevent redundant deformations and destruction of the regenerator next to the separator in operation with considerable high-frequency pulsations, hydraulic impacts and high rate of flow rise in the accumulators of FIG. 1 and FIG. 2 the regenerator 7 near the separator 6 is made with increased springiness or decreased gas permeability. Increased springiness compensates for increased loads at the jerks of the separator and can be provided by greater thickness of the leaf elements or introduction of additional elements of connection as well as by change of the distance between the weld joints 10 and 11 or change of the spacers 13 configuration.

Decreased gas permeability is provided by reduction of the number or size of the holes in the leaf elements 8 as well as by reduction of the gaps between the edges of the leaf elements and the walls of the gas reservoir 4. The lower the gas permeability and the higher the difference of the rates of expansion or compression of the gas layers between them, the more the reduced gas permeability of the regenerator 7 prevents balancing of the pressures between the separated gas layers. As the jerks of the separator 6 become stronger the growing pressure drop between these layers greater accelerates the leaf elements 8, thus reducing the load on the leaf elements 8 adjacent to the separator 6 and reducing their local deformations.

In the accumulator of FIG. 2 the separator 6 comprises the piston 14 with the chamber 15 and bellows 16 in it dividing it into the fluid 17 and gas 18 parts intercommunicating through windows 19 and 20 in the piston 14 with the fluid 2 and gas 4 reservoirs, respectively. The bellows 16 are made of metal leaf elements 21 located transversally to the direction of motion of the piston 14, dividing the gas part 18 of the chamber 15 into intercommunicating gas layers of variable depth and allowing increase of the depth of the gas layers separated by them at the volume of the gas part 18 of the chamber 15 increase and decrease of the depth at the volume decrease. At high-frequency pulsations it is not the piston 14 that vibrates but rather the lighter bellows 16, which reduces the wear of piston seals. In this case the load on the leaf elements 8 near the piston 14 also reduces, which allows embodiment of the regenerator 7 with higher gas permeability than in the accumulator of FIG. 1. The bellows 16 provide good heat regeneration at gas compression and expansion in the chamber 15 as the small depth of the gas layers between the leaf elements 21 of the bellows 16 ensures good heat exchange of the gas with the leaf elements. The distances between the leaf elements 21 and their heat capacity are chosen in the same way as for the leaf elements 8 of the regenerator 7, preferably so that the average depth of the gas layers between the leaf elements of the bellows at the maximum volume of the gas part of the chamber in the separator should not exceed 10 mm (for a better illustration the relative deformations of the leaf elements 21 and the distance between them in FIG. 2 have been enlarged and their number has been decreased, accordingly). The forced microconvection of the gas generated by oscillations of the bellows 16 at high frequency pulsations in the hydraulic system further improves the gas heat exchange with the leaf elements 8 of the regenerator 7. The flexible porous thermal insulator 12 in the form of foamed elastomer located at the periphery of the leaf elements 8 prevents spreading of the microconvective flows into the gaps between the leaf elements 8 of the regenerator 7 and the walls of the shell 1 reducing the heat exchange between the regenerator 7 and the shell 1 and the losses during power storage. The foamed elastomer is glued to the piston 14 and the leaf elements 8 allowing its stretching at the volume of the gas reservoir 4 increase, which prevents development of residual deformations of compression of the foamed elastomer and ensures its durability. The gas-proof metal bellows 16 also contribute to better preservation of the gas, which also improves the reliability and durability of the accumulator together with improved preservation of the seals of the separator and reduced loads on the regenerator.

It is preferable to chose the gas permeability and springiness of the leaf elements 8 near the separator 6 so that their local deformations should not exceed the elasticity limit at the strongest jerks of the separator 6.

The maximum jerk force of the separator 6 can be restricted by the operation conditions. For example, if the accumulator is to be used in a hydraulic hybrid car with a free piston engine, the working volume and maximum frequency of the engine displacement strokes determine the maximum acceleration and amplitude of the separator movements and the maximum force of its jerks. When the accumulator works with several rippling sources and loads, for example, in a common pressure rail, the maximum jerk force is determined as the aggregate of all sources and loads.

For a general purpose accumulator it is preferable to determine the acceleration and amplitude of accelerated movement of the separator and its maximum jerk force by the maximum possible rate of rise of the fluid flow from the accumulator at instantaneous pressure drop in the hydraulic system from the maximum to the atmospheric pressure. The maximum rate of rise of the fluid flow from the accumulator is determined, first and foremost, by the hydrodynamic characteristics of its fluid port 3.

In case of a sharp drop of pressure in the fluid reservoir 2 there arises a strong jerk of the separator 6 that shoots with a high acceleration towards the fluid port 3 entraining the attached leaf elements 8 pulling all the other layers of the regenerator 7. In the accumulator of FIG. 2 the bellows 16 are the first to respond to the pressure drop. It expands involving the piston 14 into accelerated motion, thus decreasing a little the acceleration of the piston 14 and the leaf elements 8 connected to it. Due to the decreased gas permeability of the regenerator 7 near the separator 6 conditioned by the gas dynamic resistance of the holes 22 in the leaf elements 8 and of the gaps between the leaf elements 8 and internal walls of the shell 1, there arises a pressure drop on every leaf element 8 at the jerk of the separator 6, namely on the side facing the separator 6 there arises negative pressure while on the opposite side there is excessive pressure. The arising pressure drops push every leaf element 8 towards the separator 6, thus reducing the load on the joints 10 and 11 and the local bending deformations of the leaf elements distributing stretching along the entire length of the regenerator 7. The growing gas permeability of the leaf elements 8 as they get farther on from the separator ensure smooth decline of their accelerations, which ensures uniform distribution of their deformation and prevents redundant deformations of the leaf elements both close to the separator and along the entire length of the regenerator 7. In a similar way, in case of reverse jerks of the separator 6, for example, due to hydraulic impacts, the pressure drops push the leaf elements 8 away from the separator, which decreases their local compression deformations and the load on the joints 10 and 11.

The increased springiness of the leaf elements near the separator 6 also prevents redundant deformations of the leaf elements closest to the separator as well as the leaf elements along the entire length of the regenerator 7 ensuring uniform distribution of their deformations and reducing the load on the joints 10 and 11 or connection with the spacers 13.

Piston accumulators also provide for prevention of twisting of the regenerator 7 both during assembly of the accumulator and at turns of the separator 6 that are possible during its movement. Twisting is prevented, for example, by allowing the rotation of the shell insert 9 relative to the shell 1 or by attaching the regenerator to the separator 6 by means of a separate buffer insert (not shown in the figures) installed with the possibility of rotating relative to the separator 6.

The leaf elements 8 have holes 22 located opposite holes 23 in the shell insert 9. Thus, the gas reservoir 4 communicates with the gas port 5 through the holes 23 either directly or through the collector gap clearance 24. The regenerator 7 is made with increased gas permeability near the gas port 5, in this case with increased holes 22, which compensates for the increased density of the gas flow near the gas port at gas charging and discharging and decreases the pressure drops in the regenerator making the accumulator suitable for operation together with the receiver.

To prevent damage of the regenerator at gas charging and discharging the gas port contains a flow restrictor in the form of a throttle valve (not shown in the figures) with the possibility of restricting the gas flow through the gas port so that the pressure drop on it with the open gas port should exceed, preferably 10 and more times, the maximum pressure difference between different spaces of the regenerator. When the accumulator is operated together with a receiver the flow restrictor is installed so as to restrict the flows at gas charging and discharging and not to limit the flows between the accumulator and the receiver.

The leaf elements 8 made of metal, especially if they are welded, can operate both at increased and decreased ambient temperatures.

The embodiments described above are examples of implementation of the main idea of the present invention that also contemplates a variety of other embodiments that have not been described here in detail, for example, embodiments of accumulators with an elastic separator in the form of a bladder or a membrane where the leaf elements edges are made so that not to damage the elastic separator as well as embodiments of the accumulators containing one gas reservoir and several fluid reservoirs of variable volume in one shell.

Thus, the proposed solutions allow creation of a hydropneumatic accumulator for fluid power recuperation with the following properties:

- high efficiency of fluid power recuperation
- long service life and reliability in operation as a part of a fluid power system with high rates of flow rise and hydraulic shocks causing strong jerks of the separator;
- suitability for use together with gas receivers;
- suitability for use at increased and decreased ambient temperatures.

Cited Literature.

1—L. S. Stolbov, A. D. Petrova, O. V. Lozhkin. Fundamentals of hydraulics and hydraulic drive of machines. Moscow, "Mashinostroenie", 1988, p. 172

2—U.S. Pat. No. 6,405,760

3—hydrotrole web site

4—U.S. Pat. No. 5,971,027

5—Otis D. R., "Thermal Losses in Gas-Charged Hydraulic Accumulators", Proceedings of the Eighth Intersociety Energy Conversion Engineering Conference, August 1973, pp. 198-201

6—Pourmovahed A., S. A Baum, F. J. Fronczak, N. H. Beachley "Experimental Evaluation of Hydraulic Accumulator Efficiency With and Without Elastomeric Foam", Proceedings of the Twenty-second Intersociety Energy Conversion Engineering Conference, Philadelphia, Pa., Aug. 10-14, 1987, paper 87-9090

7—U.S. Pat. No. 7,108,016

8—Pourmovahed A., "Durability Testing of an Elastomeric Foam for Use in Hydraulic Accumulators", Proceedings of the Twenty-third Intersociety Energy Conversion Engineering Conference, Denver, Colo., Jul. 31-Aug. 5, 1988. Volume 2 (A89-15176 04-44)

9—Peter A. J. Achten, "Changing the Paradigm", Proceedings of the Tenth Scandinavian International Conference on Fluid Power, May 21-23, 2007, Tampere, Finland, Vol. 3, pp. 233-248

10—Peter A. J. Achten, Joop H. E. Somhorst, Robert F. van Kuilenburg, Johan P. J. van den Oever, Jeroen Potma "CPR for the hydraulic industry: The new design of the Innas Free Piston Engine", Hydraulikdagarna '99, May 18-19, Linkoping University, Sweden 11—Peter A. J. Achten, "Dedicated Design of the Hydraulic Transformer", Proceedings of the IFK 3, Vol. 2, IFAS Aachen, pp. 233-248

The invention claimed is:

1. A hydropneumatic accumulator with a compressible regenerator comprising a shell with a fluid reservoir of variable volume connected with a fluid port and a gas reservoir of variable volume connected with a gas port, made so that to provide charging said gas reservoir with gas pressurized up to more than 7 MPa, with the gas and fluid reservoirs of variable volume separated by a separator movable relative to the shell made so that the fluid, when being pumped through said fluid port into said fluid reservoir, displaces said separator reducing the volume of said gas reservoir and increasing gas pressure in it, and the compressed gas, when expanding, displaces said separator reducing the volume of said fluid reservoir and displacing fluid out of it through said fluid port, and with the gas reservoir containing a compressible regenerator filling the gas reservoir so that the separator movement reducing the gas reservoir volume compresses said regenerator, wherein the regenerator is made of leaf elements located transversally to the separator motion direction and dividing the gas reservoir into intercommunicating gas layers of variable depth, wherein the leaf elements of the regenerator are kinematically connected with the separator allowing for increase of the depth of the gas layers separated by them at the gas reservoir volume increase and for decrease of the said gas layers depth at the gas reservoir volume decrease.

2. The accumulator according to claim 1 wherein the number, shape and arrangement of the leaf elements are chosen so that the average depth of the gas layers between the leaf elements of the regenerator does not exceed 10 mm at the maximum volume of the gas reservoir.

3. The accumulator according to claim 2 wherein the leaf elements are made elastic and joined to allow variation of the bending strain degree at the separator motion, while the number of the leaf elements as well as the number, location and shape of the joints of the neighboring leaf elements are chosen so that the local bending strains of the leaf elements do not exceed the elastic strain limits at any position of the separator.

4. The accumulator according to claim 3 wherein the regenerator is made so that the stressless state of the leaf elements corresponds to the intermediate position of the separator at which the gas reservoir volume is equal to the intermediate value between the maximum and minimum values.

5. The accumulator according to claim 4 wherein the leaf elements are made initially flat and are interconnected by spacers of the chosen thickness preferably not less than 0.3 of the average depth of the gas layer at the maximum gas reservoir volume.

6. The accumulator according to claim 4 wherein the leaf elements are molded so that their stressless state corresponds to said intermediate position of the separator.

7. The accumulator according to claim 1 wherein the separator is made in the form of a piston while the leaf elements are made of elastic metal and are joined to each other into a multilayer spring.

8. The accumulator according to claim 1 wherein the regenerator comprises a flexible porous heat insulator.

9. The accumulator according to claim 1 wherein the regenerator is made with increased rigidness near the separator.

10. The accumulator according to claim 1 wherein the regenerator is made with decreased gas permeability near the separator.

11. The accumulator according to claim 9 or 10 wherein the gas permeability and elasticity of the regenerator near the separator are chosen so that the local deformations of the leaf elements do not exceed the elastic strain limits at the strongest jerks of the separator corresponding to the maximum possible rate of rise of the fluid flow from the accumulator that may arise at instantaneous pressure drop in the hydraulic system connected to the accumulator from the maximum to the atmospheric pressure.

12. The accumulator according to claim 1 wherein the gas port contains a flow restrictor made with the possibility of restricting the gas flow through the gas port so that the pressure drop on said flow restrictor at open gas port exceeds, preferably 10 and more times, the maximum pressure difference between different spaces of the regenerator.

13. The accumulator according to claim 1 wherein the regenerator is made with increased gas permeability near the gas port.

14. The accumulator according to claim 1 wherein the gas reservoir is operative to be charged via the gas port with gas pressurized up to more than 10 MPa.

15. A hydropneumatic accumulator with a compressible regenerator comprising a shell with a fluid reservoir of variable volume connected with a fluid port and a gas reservoir of variable volume connected with a gas port, with the gas and fluid reservoirs of variable volume separated by a separator movable relative to the shell, and with the gas reservoir containing a compressible regenerator filling the gas reservoir so that the separator movement reducing the gas reservoir volume compresses said regenerator, wherein the regenerator is made of leaf elements located transversally to the separator motion direction and dividing the gas reservoir into intercommunicating gas layers of variable depth, wherein the leaf elements of the regenerator are kinematically connected with the separator allowing for increase of the depth of the gas layers separated by them at the gas reservoir volume increase and for decrease of the said gas layers depth at the gas reservoir volume decrease, wherein the leaf elements are made of elastic metal and are joined to each other into a multilayer spring, wherein the separator is made in the form of a piston with a chamber and bellows in it separating the chamber into a fluid part and a gas part communicating with the fluid and gas reservoirs, respectively, through the windows in the piston, while the bellows are made of the leaf elements located transversally to the piston motion direction dividing the gas part of the chamber in the piston into intercommunicating gas layers of variable depth and allowing for increase of the depth of the gas layers separated by said leaf elements at the volume of the gas part of said chamber increase and decrease of said gas layers depth at decrease of said gas part volume.

16. The accumulator according to claim 15 wherein the number, shape and location of the leaf elements of the bellows are chosen so that the average depth of the gas layers between the leaf elements of the bellows does not exceed 10 mm at the maximum volume of the gas part of the chamber in the piston.

17. A method of operating a hydropneumatic accumulator with a compressible regenerator comprising a shell with a fluid reservoir of variable volume connected with a fluid port and a gas reservoir of variable volume connected with a gas port, made so that to provide charging said gas reservoir with gas pressurized up to more than 7 MPa, with the gas and fluid reservoirs of variable volume separated by a separator movable relative to the shell made so that the fluid, when being pumped through said fluid port into said fluid reservoir, displaces said separator reducing the volume of said gas reservoir and increasing gas pressure in it, and the compressed gas, when expanding, displaces said separator reducing the volume of said fluid reservoir and displacing fluid out of it through said fluid port, and with the gas reservoir containing a compressible regenerator filling the gas reservoir so that the separator movement reducing the gas reservoir volume compresses said regenerator, wherein the regenerator is made of leaf elements located transversally to the separator motion direction and dividing the gas reservoir into intercommunicating gas layers of variable depth, wherein the leaf elements of the regenerator are kinematically connected with the separator allowing for increase of the depth of the gas layers separated by them at the gas reservoir volume increase and for decrease of the said gas layers depth at the gas reservoir volume decrease, the method comprising:

a) pumping the fluid through said fluid port into said fluid reservoir, which: displaces said separator reducing the volume of said gas reservoir; increases gas pressure in the gas reservoir above 7 MPa; and compresses said regenerator; and b) expanding the compressed gas in said gas reservoir, which: displaces said separator reducing the volume of said fluid reservoir; displaces fluid out of the fluid reservoir through said fluid port; and expands said regenerator.

* * * * *